E. J. KACZMAREK.
DEVICE FOR EXTRACTING AUTOMOBILES FROM MUDHOLES OR THE LIKE.
APPLICATION FILED FEB. 14, 1920.
1,342,749.
Patented June 8, 1920.
2 SHEETS—SHEET 2.
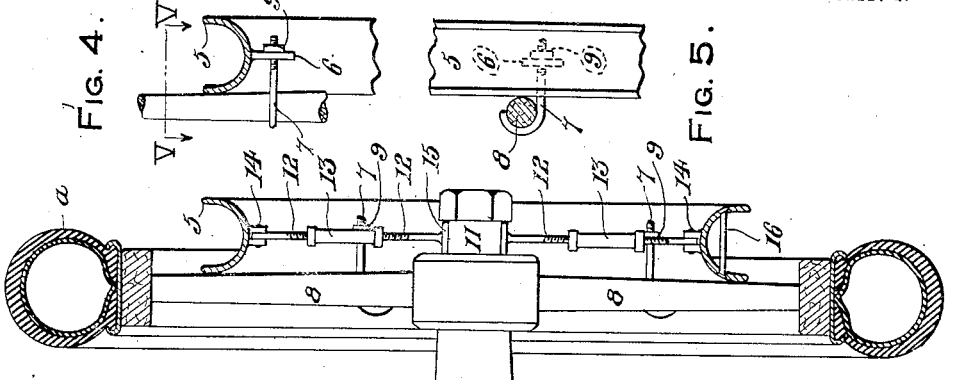
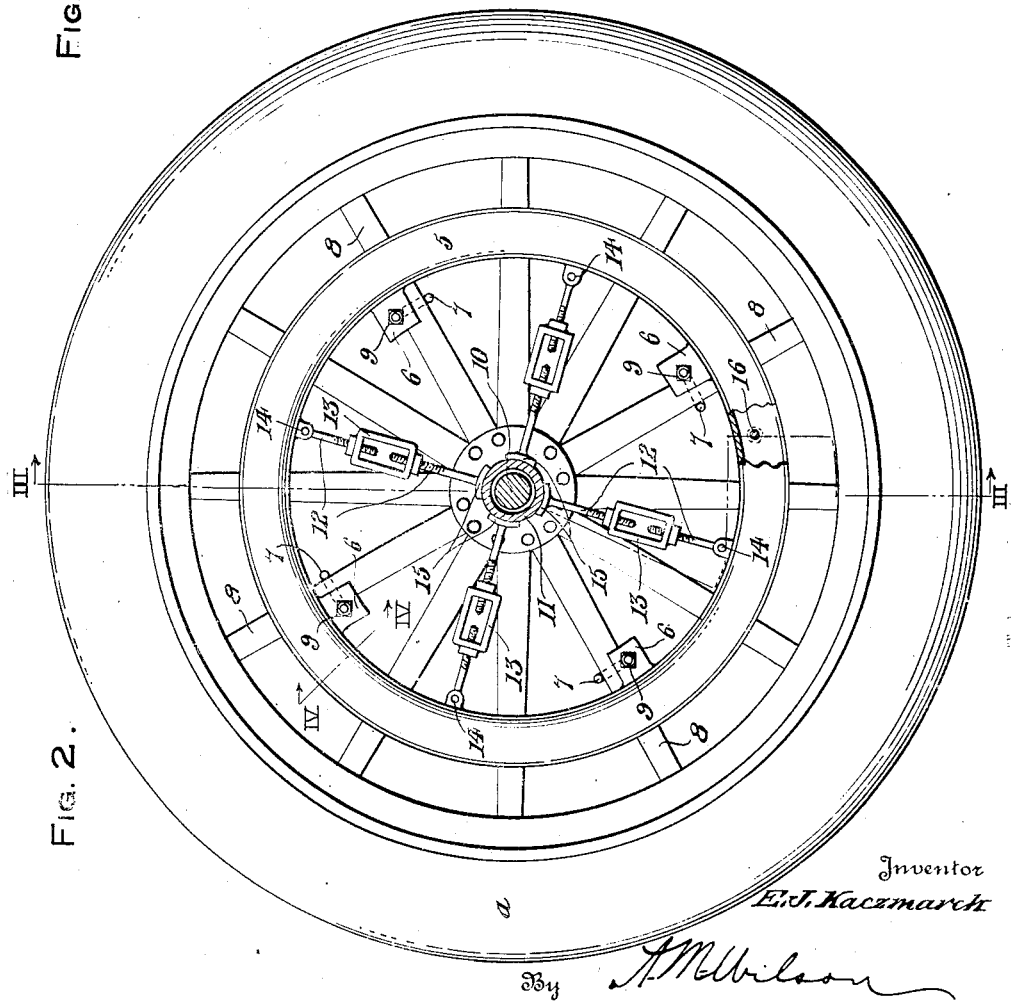
Inventor
E. J. Kaczmarek
By

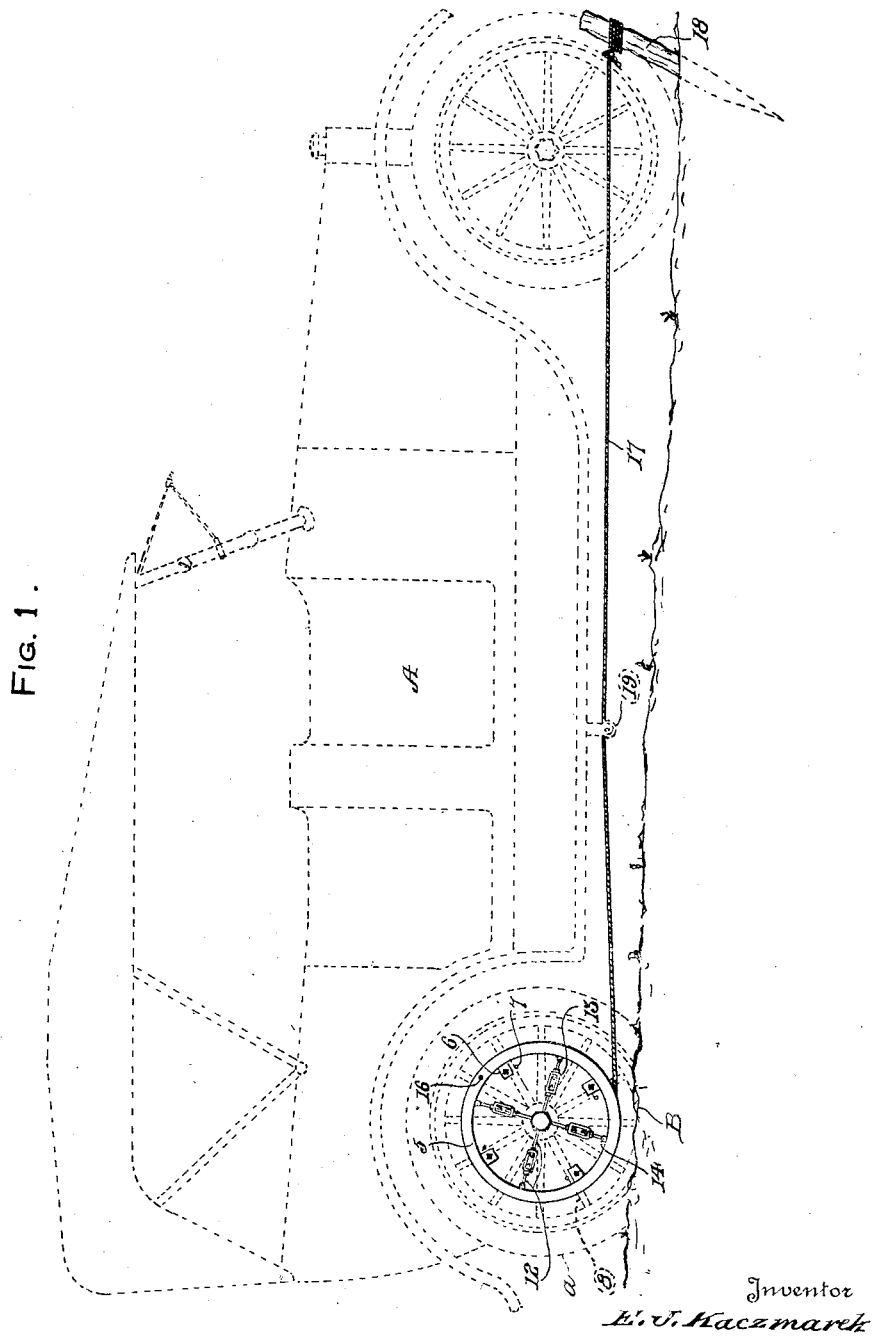

UNITED STATES PATENT OFFICE.

EDWARD J. KACZMAREK, OF STEVENS POINT, WISCONSIN.

DEVICE FOR EXTRACTING AUTOMOBILES FROM MUDHOLES OR THE LIKE.

1,342,749.	Specification of Letters Patent.	Patented June 8, 1920.

Application filed February 14, 1920. Serial No. 358,676.

*To all whom it may concern:*

Be it known that I, EDWARD J. KACZMAREK, a citizen of the United States of America, residing at Stevens Point, in the county of Portage and State of Wisconsin, have invented certain new and useful Improvements in Devices for Extracting Automobiles from Mudholes or the like, of which the following is a specification.

This invention relates to certain new and useful improvements in devices for extracting automobiles from mud holes or the like, and the invention resides particularly in a pulley attachment for the driven supporting wheels of motor vehicles adapted to have a cable anchored thereto and then wound thereon by the power of the engine of the motor vehicle so that when the other end of the cable is anchored to some distant point, an extraction or displacement of the vehicle from a mud hole, ditch or the like will be effected.

An object of the invention is to provide, in a device of the above character, an extremely simple, durable and efficient pulley attachment for the driven supporting wheels of motor vehicles so constructed as to enable the same to be readily applied to or removed from the wheel as found necessary and desirable.

Other objects will appear as the nature of the invention is better understood, and the same consists in the novel form, combination and arrangement of parts hereinafter mort fully described, shown in the accompanying drawings and claimed.

In the drawings wherein like reference characters designate corresponding parts throughout the several views, Figure 1 is a side elevational view showing by dotted lines an automobile and by full lines the present invention applied thereto so as to illustrate the manner in which it is used, Fig. 2 is a view partly in side elevation and partly in vertical section of an automobile wheel equipped with the present invention, parts being broken away, Fig. 3 is a transverse sectional view taken substantially upon line III—III of Fig. 2, Fig. 4 is a fragmentary view, partly in elevation and partly in section, and showing the engagement of the hooks with the wheel spokes for fastening the pulley to the wheel, and Fig. 5 is a sectional view taken substantially upon line V—V of Fig. 4.

Referring more in detail to the several views, an automobile A or other motor vehicle is shown in Fig. 1 by dotted lines, the rear supporting wheel *a* of said automobile being shown as standing in a mud hole or ditch as at B. Usually, the operation of extracting the automobile from a mud hole or the like is a quite laborious and objectionable one for various well known reasons, and often times the wheel *a* simply revolves under engine power without tractive effort so that extraction of the automobile is practically impossible without the aid of some external device. Accordingly, the present invention is designed to provide a much improved means for supplying this need.

In the preferred embodiment of the invention, the same includes a metallic drum or pulley 5 which is of substantially U-shaped and cross section and which is provided at suitable intervals with inwardly projecting rigid ears 6, through the apertures of which are passed the threaded shanks of hooks 7 which are so fashioned as to snugly embrace the spokes 8 of the wheel *a*, nuts 9 being threaded upon the shanks of the hooks 7 outwardly of the ears 6 so as to draw said hooks tightly into engagement with the spokes 8 at one side and the drum 5 into similar engagement with the spokes at the other side. The hooks 7 thus rigidly fasten the drum 5 to the wheel *a* as will be apparent so that when the wheel *a* is driven by the engine of the motor vehicle in the usual manner, the drum 5 will move therewith.

Some means must be provided to insure positioning of the drum 5 concentric with the rim of the wheel *a* or with the stationary rear axle of the motor vehicle which is shown at 10 in Fig. 2, and which is surrounded by the hub flange 11 of the wheel *a*. This means must also provide for the ready release of the pulley or drum from the wheel and at the same time furnish a rigid spoke construction for said drum 5. As shown more clearly in Figs. 2 to 5 inclusive, I provide for this purpose a plurality of radial adjustable spokes for the drum 5, each of which comprises a pair of screws 12, respectively of right and left hand pitch and adjustably connected by a turn buckle 13, one of the screws 12 being fastened at its outer end pivotally or otherwise as at 14 to inwardly projecting ears formed on the drum 5, and the inner free end of the other screw of each spoke being provided with a shoe 15 of arcuate formation so as to snugly engage and bear upon the periphery of the hub flange 11. Obviously, with this construction, the turning of the turn buckles 13 in one direction effects free engagement of the shoes 15 with the flange 11 so that the drum 5 is rigidly fixed in position after the hooks 7 have been adjusted as shown in Figs. 4 and 5. It will also be seen that turning of the turn buckles 13 in the opposite direction will cause a withdrawal of the shoes 15 from the flange 11 so that the drum 5 may be readily removed upon release of the hooks 7. Further, the making of the connection 14 a pivotal one, will allow swinging of the drum spokes so that the shoes 15 may accommodate themselves to their proper position upon the flange 11, while, if the shanks of the hooks 7 are made sufficiently long, said hooks need not be entirely removed from the ears 6 in order to effect detachment of the drum 5 because said hooks 7 may then be adjusted away from the spokes 8 sufficiently to allow the hooks to be turned out of the path of the spokes 8 for this purpose.

At any suitable point around the same, the drum 5 may be provided with a rigidly mounted transverse pin 16 or other suitable device to which one end of the cable 17 may be anchored for insuring winding of said cable on the drum 5 when the latter is rotated.

In operation, the drum 5 is applied to the wheel *a* as clearly shown in the drawings and hereinbefore described, and the cable 17 has one end anchored to the pin 16, while its other end may be attached to some distant rigid member such as the peg 18 which is shown driven into the ground in Fig. 1. If desired, the cable 17 may be passed through a guide 19 applied to the running board of the automobile or the like for insuring more perfect operation. The engine of the vehicle is then started and the proper devices are manipulated so as to cause rotation of the wheel *a* so as to thereby also cause rotation of the drum 5. This causes winding of the cable 17 upon said drum 5, and as the other end of said cable is anchored, the cable is held from moving and the drum must accordingly move toward the anchored end of the cable in order to effect a winding of the cable thereon. When this takes place a forward movement is necessarily imparted to the motor vehicle and this results in extraction of the latter from the mud hole, ditch or the like.

From the foregoing description it is believed that the construction and operation of the present invention will be readily understood and appreciated.

Minor changes may be made without departing from the spirit and scope of the invention as claimed.

What I claim is:—

1. In a device for extracting vehicles from mud holes or the like, a drum attachment for the driven supporting wheels of said vehicle including a drum rim having inwardly projecting ears rigid therewith, hooks adjustable transversely through the ears and arranged to engage and clamp the spokes of the vehicle wheel, and spokes projecting radially inwardly from and carried by said drum rim, said spokes having hub flange engaging shoes upon their inner ends.

2. In combination with a drum rim having means to clamp the same to the spokes of a vehicle supporting wheel, radial spokes adjustable in length projecting inwardly from and carried by said drum rim, and hub flange engaging shoes carried upon the inner ends of said drum spokes.

3. In combination with a drum rim having means to clamp the same to the spokes of a vehicle supporting wheel, radial spokes adjustable in length projecting inwardly from and carried by said drum rim, hub flange engaging shoes carried upon the inner ends of said drum spokes, each of said spokes involving a pair of screws respectively of right and left hand pitch and adjustably connected by a turn buckle, one of said screws being pivotally mounted to the drum rim, and the other of said screws carrying a hub flange engaging shoe.

In testimony whereof I affix my signature.

EDWARD J. KACZMAREK.